3,168,920
USE OF ASPHALT EMULSIONS FOR SEALING ZONES OF LOST CIRCULATION

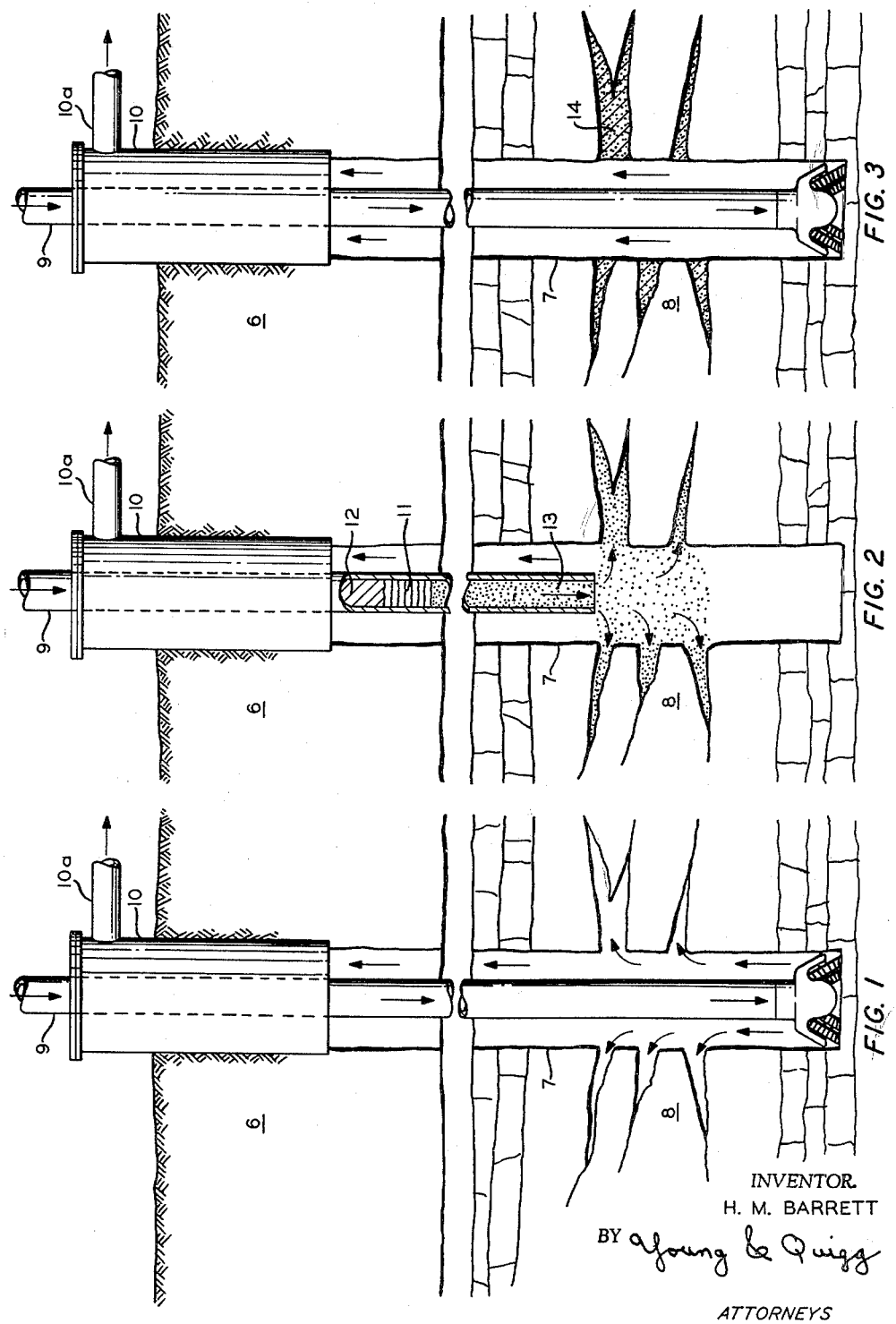

Herbert M. Barrett, Bartlesville, Okla., assignor to Phillips Petroleum Company, a corporation of Delaware
Filed Dec. 14, 1961, Ser. No. 159,326
7 Claims. (Cl. 166—5)

This invention relates to a method of combatting the problem of lost circulation zones encountered in drilling of oil wells. In another aspect is relates to the injection of an asphalt emulsion after carefully selected and sized solid particles have been put in place at the point of loss by the drilling fluid in which they are carried. The proper selection of composition of the solid insures breaking the emulsion to insure substantial sealing of a lost circulation zone located in a formation of undetermined composition.

The problem of combatting lost circulation zones during the course of well drilling has long been recognized. Various remedial procedures, usually involving the compounding of the drilling fluid system, have been developed. In especially severe zones, asphalt may be used for grouting the highly permeable zone. One particular difficulty where lost circulation zones are involved is that the type of formation in which the zone is located is not always known or readily ascertainable. Thus, it cannot be decided ahead of time which type of asphalt emulsion, cationic or anionic, should be injected to insure a breaking thereof in situ upon contacting the walls of the zone. Though a cationic emulsion will be broken on contacting a siliceous formation, for example, and an onionic emulsion broken by a limestone formation, this presumes that the operator knows the substructure, and exactly wherein the zone is located. Trial and error injection of the emulsions available is most uneconomical.

It is therefore, an object of this invention to provide an improved process for closing off zones of lost circulation penetrated by well bores.

It is another object of this invention to insure the breaking of an asphalt emulsion being used to grout a lost circulation zone upon reaching the same.

It is yet another object of this invention to achieve substantial asphalt plugging of a lost circulation zone located in an underground formation of undetermined composition.

Other aspects, objects, and the several advantages of the invention will be apparent from a study of the disclosure and the appended claims.

According to this invention, there is proposed a two-step method of insuring that an emulsion injected will be broken, in situ, regardless of the type of strata in which the lost circulation zone is located. To achieve this, a solid of a suitable size and shape is chosen to effectively bridge the openings present in the lost circulation zone, and of a composition to achieve the rapid break of an asphalt emulsion which is later brought in contact with it. The particulate sized solids will be chosen from a group such as ground limestone, ground dolomite, popped vermiculite, expanded perlite, natural or modified diatomaceous earth, ground plastics, mica, and the like, and combinations of these. These materials are often used to bridge vugs, crevices, fissures, etc., encountered in drilling wells and causing loss of circulation. These materials can be put in place in such openings by circulating them as a part of the drilling fluid in use. They will be deposited in such openings by the drilling fluid which will escape further into the openings. The exact location and nature of these openings need not be known. The nature of the solids so deposited is known and their ability to cause either a cationic or anionic emulsion to break has been established. The solid having the greatest ability to break the available emulsion can be used. Alternatively, if both types of emulsions are available, the cheapest and most convenient solid can be used. Generally, the particulate solid chosen will have a predominant electrical charge adapted to break the particular emulsion employed.

The asphalt emulsion is injected through the drill pipe and circulated into the annulus defined by the pipe and well bore. Upon reaching the precoated zone, the emulsion will break on contact. The emulsion injection will continue until the zone is substantially plugged up. This will be indicated when drilling fluid flows from the flow line in a quantity substantially equal to the amount of drilling fluid being pumped down the drill pipe. The seal can be further tested by closing the blow-out preventer rams (not shown) and raising the pump pressure on the injection line to a preselected level.

To accomplish the objects of our invention there is provided for grouting either a cationic or anionic asphalt emulsion. A suitable cationic asphalt emulsion comprises: 65 parts by weight of asphalt; and 34.4 parts of relatively pure water. An asphalt-in-water emulsion was formed of these components by the use of an emulsifier further comprising 0.5 weight percent of the emulsion, the emulsifier being the HCl addition product of a cation, surface-active agent, specifically tallow diamine hydrochloride. The emulsion is probably slightly acidified by the remainder of the hydrochloric acid, which did not combine with the surfactant. The formation of the emulsion in the colloid mill is promoted by the addition of about 0.1 weight percent of a metal salt, preferably calcium chloride. These promoters are selected from the calcium, sodium, aluminum, ammonium, magnesium and lead salts of hydrochloric, nitric and sulfuric acids. Particularly useful are sodium, ammonium, and aluminum chloride, lead nitrate, and aluminum sulfate.

A preferred method for compounding the cationic asphalt emulsion to be used in the method of this invention is disclosed in the copending application of Brandt et al., Serial No. 78,695, filed December 27, 1960.

A suitable anionic asphalt emulsion is prepared from the same materials, excepting for the choice of emulsifying agent. In place of the cationic emulsifier previously described, an anionic emulsifying agent, such as a soap, is substituted. Among the suitable emulsifiers are: sodium stearate, potassium laurate, morpholene oleate, glycerol monostearate containing a soap, lithium stearate, magnesium oleate, and aluminum stearate.

The invention will be more readily understood from a study of the following specification and accompanying drawing, wherein:

FIGURE 1 is a schematic view of a well bore illustrating the bore traversing a subterranean formation having a zone which causes loss of circulation of drilling fluid; and FIGURE 2 is a similar view illustrating the filling and bridging achieved by the solids put in place by the drilling fluid.

FIGURE 3 is a similar view illustrating the asphalt in place after the emulsion has broken on contact with the bridged solids and grouted them in place.

Referring now to the drawing, and FIGURE 1 in particular, there is shown a typical underground formation 6 penetrated by a well bore 7 to which the instant invention may be applied. The fissured structure of zone 8 is such that the drilling fluid enters and is lost to the formation. As a result, circulation of said fluid cannot be maintained during a drilling operation. It therefore becomes necessary that the lost circulation zone 8 be sealed off from the bore 7 before the drilling operation can proceed.

The solids are added to the drilling fluid, either by use of a conventional hopper, or by being dumped around the drilling rig pump (not shown) suction. In either case, the solids enter the pump suction with the drilling mud, are pumped down the drill pipe or other tubing 9 in use to a point near the suspected loss zone 8, and enter the bore hole where they are carried into the thief openings where they coat and bridge, as depicted in FIGURE 2. The proper emulsion is then introduced to the mud pump either from a suction pit, cleaned of normal drilling mud, or a tank (not shown) specially obtained to hold the emulsion. The emulsion enters the suction end of the rig pump (not shown) is pumped down the drill pipe or tubing 9 where it also enters the well bore 7 substantially unmixed with drilling fluid. It also finds its way to the point of loss where it contacts the particulate solids already in place, and breaks. This deposits the asphalt on, around, and between the solids in place. Thus, filling and grouting is accomplished in situ by this procedure, irrespective of the nature of the formation in which the loss of circulation occurs. Drilling fluid and unbroken emulsion returns to the surface via the annulus defined by tubing 9 and casing 10, and is conducted to pits (not shown) via flow line 10a.

The solids will comprise from 5 to 200 pounds per barrel of drilling fluid, and preferably between 5 and 60 pounds per barrel for greatest economy.

In certain instances, the drilling mud in use on a well may itself break either the cationic or an anionic asphalt emulsion being put in place. In order to prevent this happening in the tubing, a separating fluid 11 must be placed between the emulsion 12 and the drilling mud 13. This separating fluid must be compatible with both fluids being separated, and must itself be able to maintain good hole conditions, such as thin wall cake and low loss of fluid to porous formations. Such a separating fluid is oil, either refined or crude, containing Soltex. Soltex is a registered trademark for sulfonated asphalt. The amount of Soltex must be sufficient to give wall-building properties to the oil. This will be an amount ranging between one-fourth and twenty pounds per barrel of drilling fluid.

Initially, treated drilling fluid is introduced in an amount approximately equal to the volume of said bore hole. Then, roughly one volume of emulsion for each volume of treated drilling fluid that was circulated is injected. However, the pump may continue to force emulsion down the tubing until mud begins to come out the flow line, indicating that zone 8 is substantially plugged. Preferably, a predetermined volume has been injected. Introduction of drilling fluid into the well is resumed, to determine if said drilling fluid flows from the well in a quantity substantially equal to the volume thereof being introduced. If not, the injection sequence is repeated until this test is met. A successful plug will no longer permit lost circulation when the fissured formation is subjected to the hydrostatic head of a circulating drilling fluid. This condition is shown as plug 14 in FIGURE 3. When a satisfactory plug is achieved, the equipment is rearranged to permit resumption of the drilling operation.

In grouting operations, the prepared emulsion may be temporarily stored at the site, provided it is maintained under non-freezing conditions.

The asphalt employed in this invention may be any asphalt which has been determined by methods well known to those skilled in the art as being suitable for road paving. It has been found that asphalts, having a penetration at 25° C. of from 85 to 300, are suitable for forming the emulsion employed in this invention. For the penetration range described above, heating to about 250°–300° C. will provide a hot liquid asphalt suited to be fed to a colloid mill for the combination and emulsification therein. The asphalt content of the final emulsion will range between 60 and 70 parts by weight. In certain circumstances, the described asphalt emulsion may be further diluted with from 1 to 10 parts water per part of prepared emulsion.

Among the proper particulate solids for breaking cationic asphalt emulsions, are ground sandstone, mica expanded vermiculite, diatomaceous earth, whether calcined or natural, and perlite.

Generally speaking, a particulate solid having a preponderance of negative surface electrical charges is adapted to break a cationic asphalt emulsion upon contacting the same. Such particulate solids are said to have a negative electrical charge.

Generally speaking, a particulate solid having a preponderance of positive surface electrical charges is adapted to break an anionic asphalt emulsion upon contacting the same. Such particulate solids are said to have a positive electrical charge.

Certain solids have both positive and negative charges present on their surfaces, and may break either type of emulsion, though the cationic type is usually more susceptible in this regard. Among these are siliceous limestones and other minerals containing a balance between silica, $SiO_2$, and alkaline earth oxides. Synthetic alkaline earth silicates, such as calcium silicate, may be so balanced and may be made by calcining diatonite with lime.

The flowing pressure which will indicate that a strong effective seal has been produced for a particular formation and depth of grouting is calculatable by those skilled in fluid mechanics. It is well known in the art that the pressure on the formation at a given level underground will be the sum of the flowing pressure of the injected material plus the static head down to that level less the friction pressure loss due to the flow of the injected fluid through the tubing. For the purposes of this invention, however, it will be sufficient to establish that a seal has been effected by the indication that no significant loss of drilling fluid occurs, when it is circulated through the well at a rate which allows normal drilling operations to proceed, or drilling fluid is returned to the surface, without significant loss of volume.

The loss of drilling muds that occurs in areas such as Louisana and Texas gulf coast is generally due to a parting or separating of an exposed formation. This parting is caused by the hydraulic pressure exerted by the drilling fluid. This hydraulic pressure is, in turn, a function of mud weight, pressure drop in the annulus. It is seldom known by the operator exactly at what depth, or in what formation, such loss occurs. One application of the invention applies to such losses. It is known that materials normally used as filter aids, such as attapulgite, diatomite, and expanded perlite, will be deposited in theif zones created in this manner. After such filter aids have been put in place by being strained from the drilling mud, the proper asphalt emulsion is circulated by this point, enters the point of loss, breaks, and is deposited on the filter.

Various modifications and alterations of this invention will become apparent to those skilled in the art without departing from the scope and spirit of this invention and it should be understood that the latter is not necessarily limited to the aforementioned discussion.

I claim:

1. A method for decreasing the permeability of a zone of lost circulation located in a formation of undetermined composition and penetrated by a well bore, comprising: placing in said zone a particulate solid having an electrical charge which serves as an emulsion breaker for an impermeabilizing fluid to be employed, the amount of said solid being sufficient to at least line said lost circulation zone to insure a substantial break of said fluid; injecting as said fluid an asphalt emulsion into said zone subsequent to said solid deposition in a predetermined amount; resuming introduction of a drilling fluid into said well to determine if said drilling fluid flows from the well in a quantity substantially equal to the volume thereof being introduced; repeating the aforedescribed sequence of injection of particulate solid, emulsion, and drilling fluid until said substantial equivalence of drilling fluid introduction and recovery from said well is attained.

2. A method for decreasing the fluid permeability of a zone of lost circulation located in a formation comprising: circulating into said zone through a first conduit depending within a borehole a particulate solid dispersed in a drilling fluid which serves as an emulsion breaker for an asphalt emulsion to be employed, the amount of said solid being sufficient to at least line said zone and to insure a substantial break of said emulsion; initially injecting a volume of the asphalt emulsion into said zone approximately equal to the volume of said drilling fluid in the borehole; resuming introduction of a drilling fluid into said well to determine if said drilling fluid flows from the well in a quantity substantially equal to the volume thereof being introduced; repeating the aforedescribed sequence of injection of particulate solid, emulsion, and drilling fluid until said substantial equivalence of drilling fluid introduction and recovery from said well is attained.

3. A method for decreasing the permeability of a zone of lost circulation located in a formation of undetermined composition and penetrated by a well bore comprising: placing in said zone a particulate solid having an electrical charge which serves as an emulsion breaker for an impermeabilizing fluid to be employed, the amount of said solid being sufficient to at least line said lost circulation zone to insure a substantial break of said fluid; injecting as said fluid an asphalt emulsion into said zone subsequent to said solid deposition until flow from the well bore is substantially equal to the volume of emulsion being introduced into said well bore.

4. A method for decreasing the fluid permeability of a zone of lost circulation located in a formation comprising: circulating into said zone through a first conduit depending within a bore hole a particulate solid dispersed in a drilling fluid and having a negative electrical charge which serves as an emulsion breaker for a cationic asphalt emulsion to be employed, the amount of said solid being sufficient to at least line said zone and to insure a substantial break of said emulsion; initially injecting the asphalt emulsion into said zone in a volume approximately equal to the volume of particulate-solid bearing drilling fluid previously circulated; resuming introduction of said drilling fluid into said well to determine if said drilling fluid flows from the well in a quantity substantially equal to the volume thereof being introduced; repeating the aforedescribed sequence of injection of particulate solid, emulsion, and drilling fluid until said substantial equivalence of drilling fluid introduction and recovery from said well is attained.

5. A method for decreasing the fluid permeability of a zone of lost circulation located in a formation comprising: circulating into said zone through a first conduit depending with a bore hole a particulate solid dispersed in a drilling fluid and having a positive electrical charge which serves as an emulsion breaker for an anionic asphalt emulsion to be employed, the amount of said solid being sufficient to at least line said zone and to insure a substantial break of said emulsion; initially injecting the asphalt emulsion into said zone in a volume approximately equal to the volume of particulate-solid bearing drilling fluid previously circulated, resuming introduction of said drilling fluid into said well to determine if said drilling fluid flows from the well in a quantity substantially equal to the volume thereof being introduced; repeating the aforedescribed sequence of injection of particulate solid, emulsion, and drilling fluid until said substantial equivalence of drilling fluid introduction and recovery from said well is attained.

6. A method for decreasing the fluid permeability of a zone of lost circulation located in a formation comprising: circulating into said zone through a first conduit depending with a borehole a particulate solid selected from the group consisting of ground sandstone, mica, perlite, expanded vermiculite, natural diatomaceous earth and calcined diatomaceous earth dispersed in a drilling fluid which serves as an emulsion breaker for a cationic asphalt emulsion to be employed, the amount of said solid being sufficient to at least line said zone and to insure a substantial break of said emulsion; initially injecting the asphalt emulsion into said zone in a volume approximately equal to the volume of particulate-solid bearing drilling fluid circulated and injecting an additional volume of said emulsion into said formation until fluid emerges from the surface of the borehole.

7. A method for decreasing the fluid permeability of a zone of lost circulation located in a formation comprising: circulating into said zone through a first conduit depending within a borehole a particulate solid selected from the group consisting of ground limestone, dolomite, and diatomite calcined with a fusible alkali salt dispersed in a drilling fluid which serves as an emulsion breaker for an anionic asphalt emulsion to be employed, the amount of said solid being sufficient to at least line said zone and to insure a substantial break of said emulsion; initially injecting the asphalt emulsion into said zone in a volume approximately equal to the volume of particulate-solid bearing drilling fluid circulated; and injecting an additional volume of said emulsion into said formation until fluid emerges from the surface of the borehole.

References Cited in the file of this patent
UNITED STATES PATENTS

| 2,201,459 | Van Hulst | May 21, 1940 |
| 2,761,511 | Billue | Sept. 4, 1956 |
| 2,990,016 | Goins et al. | June 27, 1961 |
| 3,064,436 | Loofbourow et al. | Nov. 20, 1962 |

OTHER REFERENCES

Lost Circulation Materials and Mud Additives, The Oil and Gas Journal, Dec. 28, 1950, pp. 64, 66 and 67, Carlson, Roy F.